United States Patent
Liu et al.

(10) Patent No.: US 9,660,781 B2
(45) Date of Patent: May 23, 2017

(54) METHODS AND RELATED DEVICES FOR SENDING AND RECEIVING UPLINK CONTROL SIGNALING

(71) Applicant: HUAWEI TECHNOLOGIES CO., LTD., Shenzhen (CN)

(72) Inventors: Jianghua Liu, Beijing (CN); Kunpeng Liu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 507 days.

(21) Appl. No.: 14/148,269

(22) Filed: Jan. 6, 2014

(65) Prior Publication Data
US 2014/0119336 A1    May 1, 2014

Related U.S. Application Data

(63) Continuation of application No. PCT/CN2012/078367, filed on Jul. 9, 2012.

(30) Foreign Application Priority Data

Jul. 7, 2011   (CN) .......................... 2011 1 0189984

(51) Int. Cl.
*H04L 5/00*   (2006.01)
*H04L 1/00*   (2006.01)

(52) U.S. Cl.
CPC .......... *H04L 5/0053* (2013.01); *H04L 1/0073* (2013.01)

(58) Field of Classification Search
CPC ........ H04W 72/04; H04L 1/00; H04L 1/0073; H04L 5/0053
See application file for complete search history.

(56) References Cited

U.S. PATENT DOCUMENTS

| 8,594,017 B2* | 11/2013 | Xia ........................ H04J 11/003 |
| | | 370/328 |
| 2008/0025267 A1* | 1/2008 | Wei ........................ H04L 1/0025 |
| | | 370/337 |

(Continued)

FOREIGN PATENT DOCUMENTS

| CN | 101873602 A | 10/2010 |
| CN | 101888702 A | 11/2010 |

(Continued)

OTHER PUBLICATIONS

International Search Report mailed Oct. 18, 2012, in corresponding International Application No. PCT/CN2012/078367.

(Continued)

*Primary Examiner* — Ian N Moore
*Assistant Examiner* — Latresa McCallum
(74) *Attorney, Agent, or Firm* — Staas & Halsey LLP

(57) ABSTRACT

Embodiments of the present invention disclose methods and related devices for sending and receiving uplink control signaling. On a terminal side, the terminal performs data processing and resource mapping separately for the uplink control signaling and uplink data that are scheduled by a base station, so as to obtain a frequency domain signal, where the performing resource mapping separately refers to mapping the data-processed uplink control signaling and uplink data to different resource block groups in a system bandwidth separately; and the terminal performs frequency-to-time conversion for the obtained frequency domain signal to obtain a time domain signal, and then sends the signal to the base station.

20 Claims, 7 Drawing Sheets

(56) References Cited

U.S. PATENT DOCUMENTS

| | | |
|---|---|---|
| 2008/0186928 A1* | 8/2008 | Usuda ................ H04W 28/22 370/338 |
| 2008/0287155 A1 | 11/2008 | Xu et al. ...................... 455/522 |
| 2009/0232070 A1 | 9/2009 | Muharemovic et al. |
| 2010/0195575 A1 | 8/2010 | Papasakellariou et al. |
| 2010/0284377 A1 | 11/2010 | Wei et al. |
| 2011/0032926 A1 | 2/2011 | Xia et al. ...................... 370/345 |

FOREIGN PATENT DOCUMENTS

| | | |
|---|---|---|
| EP | 2448161 | 5/2012 |
| WO | 2009/129681 A1 | 10/2009 |
| WO | 2010/150800 | 12/2010 |

OTHER PUBLICATIONS

Extended European Search Report dated Jun. 3, 2014 in corresponding European Patent Application No. 12806873.1.
International Search Report mailed Oct. 18, 2012, in corresponding International Patent Application No. PCT/CN2012/078367 X.

* cited by examiner

METHODS AND RELATED DEVICES FOR SENDING AND RECEIVING UPLINK CONTROL SIGNALING

CROSS-REFERENCE TO RELATED APPLICATION

This application is a continuation of International Application No. PCT/CN2012/078367, filed on Jul. 9, 2012, which claims priority to Chinese Patent Application No. 201110189984.9, filed on Jul. 7, 2011, both of which are hereby incorporated by reference in their entireties.

TECHNICAL FIELD

The present invention relates to the field of wireless communications technologies, and in particular, to methods and related devices for sending and receiving uplink control signaling.

BACKGROUND

In an LTE system, before a base station performs uplink scheduling, a terminal measures the downlink channel quality, and feeds back the measured CSI (Channel State Information, channel state information) as uplink control signaling to the base station, so that the base station performs uplink scheduling according to the uplink control signaling. The uplink control signaling at least includes: a CQI (Channel Quality Indicator, channel quality indicator), a PMI (Precoding Matrix Indicator), an RI (Rank Indicator, rank indicator), and a HARQ (Hybrid Automatic Repeat Request, hybrid automatic repeat request). The feedback modes of the terminal include periodic feedback and aperiodic feedback. In the case of aperiodic feedback, if uplink data is scheduled, the terminal needs to perform resource multiplexing for the uplink control signaling and the uplink data as specified in R10. In the resource multiplexing, the time-frequency resources occupied by the CQI and the RI are different from the time-frequency resources occupied by the uplink data, and the HARQ occupies the resources of the uplink data by puncturing data.

When resource multiplexing is performed for the uplink control signaling and the uplink data, the resources of the uplink control signaling are calculated by:

$$Q'_{temp} = \left\lceil \frac{O \cdot M_{sc}^{PUSCH\text{-}initial(1)} \cdot N_{symb}^{PUSCH\text{-}initial(1)} \cdot M_{sc}^{PUSCH\text{-}initial(2)} \cdot N_{symb}^{PUSCH\text{-}initial(2)} \cdot \beta_{offset}^{PUSCH}}{\sum_{r=0}^{C^{(1)}-1} K_r^{(1)} \cdot M_{sc}^{PUSCH\text{-}initial(2)} \cdot N_{symb}^{PUSCH\text{-}initial(2)} + \sum_{r=0}^{C^{(2)}-1} K_r^{(2)} \cdot M_{sc}^{PUSCH\text{-}initial(1)} \cdot N_{symb}^{PUSCH\text{-}initial(1)}} \right\rceil$$

In the above formula, $Q'_{temp}$ is the number of REs (Resource Elements, resource elements) allocated to the uplink control signaling, O is the original number of bits of the CSI, $M_{sc}^{PUSCH\text{-}initial(1)}$ is the number of subcarriers allocated to a first transport block on a PUSCH (Physical Uplink Shared Channel, physical uplink shared channel), $N_{symb}^{PUSCH\text{-}initial(1)}$ is the number of OFDM symbols allocated to the first transport block on the PUSCH, $M_{sc}^{PUSCH\text{-}initial(2)}$ is the number of subcarriers allocated to a second transport block on the PUSCH, and $N_{symb}^{PUSCH\text{-}initial(2)}$ is the number of OFDM symbols allocated to the second transport block on the PUSCH.

$$\sum_{r=0}^{C^{(1)}-1} K_r^{(1)}$$

is the original number of bits of the first transport block on the PUSCH, and $$\sum_{r=0}^{C^{(2)}-1} K_r^{(2)}$$

is the original number of bits of the second transport block on the PUSCH. $\beta_{offset}^{PUSCH}$ is a ratio of a CSI coding rate to a data coding rate.

When resources are allocated to the uplink control signaling, the allocated resources are calculated according to the total resources allocated to the physical uplink shared channel, that is, the resources occupied by the uplink control signaling depend on the total resources of the physical uplink shared channel. Meanwhile, to ensure transmission reliability of the physical uplink shared channel, the resource overhead of the uplink control signaling is also considered when the total resources are allocated to the physical uplink shared channel, that is, the total resources of the physical uplink shared channel further depend on the resources of the uplink control signaling. It can be seen that, when resources are allocated to the uplink control signaling, the following resource nesting is formed: The resources of the uplink control signaling depend on the total resources of the physical uplink shared channel, the total resources of the physical uplink shared channel further depend on the resources of the uplink control signaling, and the resources of the uplink control signaling further depend on the total resources of the physical uplink shared channel, and so on.

Obviously, the resource nesting will cause a resource waste problem to the uplink control signaling resource allocation inevitably. Especially, when a data packet of the uplink control signaling is large, the resource waste is even more serious.

SUMMARY

Embodiments of the present invention provide methods and related devices for sending and receiving uplink control signaling to avoid the resource waste problem.

The embodiments of the present invention disclose the following technical solutions:

A method for sending uplink control signaling includes:
performing, by a terminal, data processing separately for uplink control signaling and uplink data that are scheduled by a base station;
performing, by the terminal, resource mapping separately for the data-processed uplink control signaling and uplink data to obtain a frequency domain signal, where the performing resource mapping separately refers to mapping the data-processed uplink control signaling and uplink data to different resource block groups of a system bandwidth separately, and the resource block group is formed by at least one resource block; and
performing, by the terminal, frequency-to-time conversion for the obtained frequency domain signal to obtain a time domain signal, and then sending the signal to the base station.

A method for receiving uplink control signaling includes:
receiving, by a base station, a time domain signal including uplink control signaling and uplink data from a terminal, and performing time-to-frequency conversion to obtain a frequency domain signal; and performing, by the base station, resource demapping for the frequency domain signal obtained by the conversion so as to obtain the uplink control signaling and the uplink data, where the resource demapping refers to extracting the uplink control signaling and the uplink data from different resource block groups of a system bandwidth separately, and the resource block group is formed by at least one resource block.

A terminal includes:

a data processing unit, configured to perform data processing separately for uplink control signaling and uplink data that are scheduled by a base station;

a resource mapping unit, configured to perform resource mapping separately for the uplink control signaling and the uplink data that are processed by the data processing unit, so as to obtain a frequency domain signal, where the performing resource mapping separately refers to mapping the data-processed uplink control signaling and uplink data to different resource block groups of a system bandwidth separately, and the resource block group is formed by at least one resource block; and a signal sending unit, configured to perform frequency-to-time conversion for the frequency domain signal obtained by the resource mapping unit to obtain a time domain signal, and then send the signal to the base station.

A base station includes:

a signal receiving unit, configured to receive a time domain signal including uplink control signaling and uplink data from a terminal, and perform time-to-frequency conversion for the received time domain signal to obtain a frequency domain signal; and a demapping unit, configured to perform resource demapping for the frequency domain signal obtained by the conversion by the signal receiving unit so as to obtain the uplink control signaling and the uplink data, where the resource demapping refers to extracting the uplink control signaling and the uplink data from different resource block groups of a system bandwidth, and the resource block group is formed by at least one resource block.

As can be seen from the above embodiments, on a terminal side, uplink control signaling and uplink data are carried in different resource block groups in a PRB respectively. Based on such a resource allocation mode, the uplink control signaling and the uplink data undergo data processing and resource mapping separately. Correspondingly, on a base station side, the uplink control signaling and the uplink data undergo resource demapping and data processing separately. Therefore, resources of the uplink control signaling and resources of the uplink data are determined separately without depending on each other, which avoids resource nesting and further avoids resource waste caused by the resource nesting.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, features, and advantages of the present invention more comprehensible, the following describes the embodiments of the present invention in detail with reference to the accompanying drawings.

Embodiment 1

Figure 1:
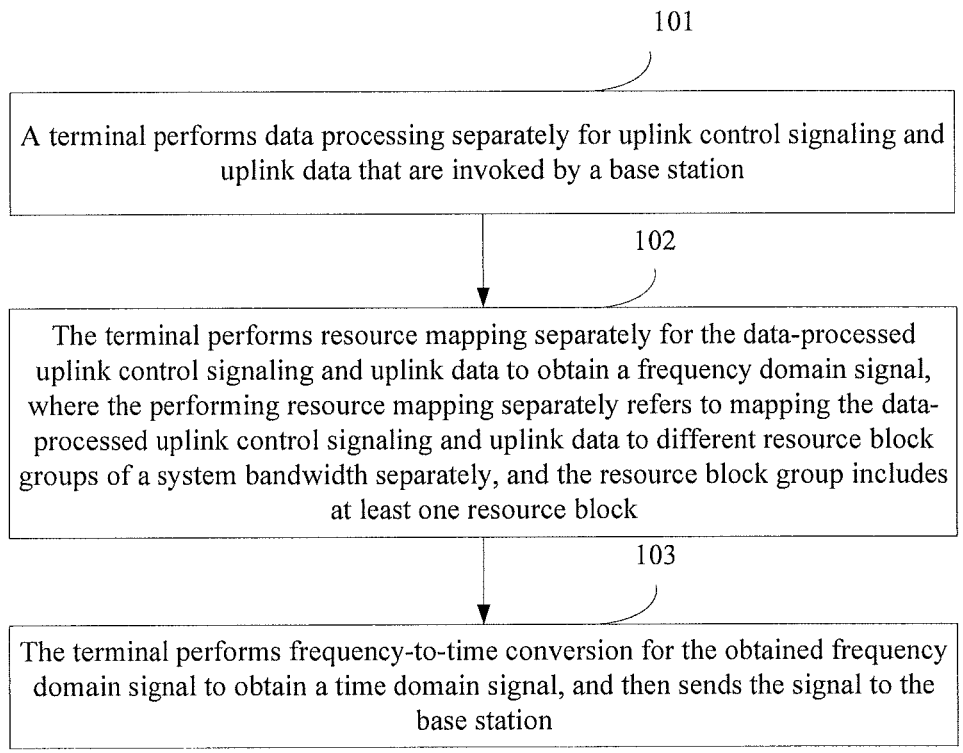
FIG. 1 is a flowchart of an embodiment of a method for sending uplink control signaling according to the present invention.

FIG. 1 is a flowchart of an embodiment of a method for sending uplink control signaling according to the present invention. The method includes the following steps:

Step 101: A terminal performs data processing separately for uplink control signaling and uplink data that are scheduled by a base station.

In the process of sending the uplink control signaling, the data processing at least includes any one or any combination of additional CRC, channel coding, scrambling, modulation, layer mapping, linear transformation, and precoding.

It should be noted that the processing steps and order included in the data processing in the present invention are the same as the processing steps and order included in the data processing performed for sending uplink control signaling in the prior art. Because the processing steps and processing orders included in different types of data processing in the prior art are different from each other, the present invention does not specifically limit the entire data processing process, but is applicable so long as the uplink control signaling and the uplink data scheduled by the base station undergo data processing separately.

In the prior art, additional CRC processing is required for the uplink data. For the uplink control signaling, some uplink control signaling needs to undergo additional CRC processing, and other uplink control signaling does not need to undergo additional CRC processing. In addition, when both the uplink control signaling and the uplink data need to undergo additional CRC processing, the terminal performs additional CRC processing for the uplink control signaling and the uplink data separately. Therefore, in the technical solutions of the present invention, the terminal still performs data processing for the uplink control signaling and the uplink data separately according to the method in the prior art.

Preferably, when performing channel coding, the terminal determines a channel coding rate of the uplink control signaling and a channel coding rate of the uplink data respectively according to the number of resource elements REs in a first resource block group that carries the uplink control signaling and that in a second resource block group that carries the uplink data;

when performing scrambling, the terminal scrambles the uplink control signaling by using an initial value of a second scrambling sequence different from an initial value of a first scrambling sequence applied in scrambling the uplink data, where the initial value of the second scrambling sequence is greater than the initial value of the first scrambling sequence by one offset; or, the terminal compares a data stream length of the uplink control signaling with a data stream length of the uplink data, and if the data stream length of the uplink data is greater than the data stream length of the uplink control signaling, the terminal intercepts a scrambling sequence of the uplink control signaling from a scrambling sequence of the uplink data, and if the data stream length of the uplink control signaling is greater than the data stream length of the uplink data, the terminal intercepts the scrambling sequence of the uplink data from the scrambling sequence of the uplink control signaling, where initial values of the scrambling sequences of the uplink control signaling and the uplink data are the same;

when performing modulation, if a modulation mode of the uplink control signaling is different from a modulation mode of the uplink data, before the terminal performs data processing for the uplink control signaling, the terminal receives the modulation mode of the uplink control signaling, which is notified by the base station dynamically or configured by a higher layer, or, fixes the modulation mode of the uplink control signaling of the terminal to a preset modulation mode;

when performing layer mapping, the terminal maps the uplink control signaling and the uplink data to different layers of respective codewords; if the number of layers of the uplink control signaling is different from the number of layers of the uplink data, before the terminal performs data processing for the uplink control signaling, the terminal receives the number of layers of the uplink control signaling, which is notified by the base station dynamically or configured by the higher layer, or, fixes the number of layers of the uplink control signaling of the terminal to a preset number of layers;

when linear transformation is performed, a target length of the transformed uplink control signaling is the number of frequency domain subcarriers in a resource block group used for carrying the uplink control signaling, and a target length of the transformed uplink data is the number of frequency domain subcarriers in a resource block group used for carrying the uplink data; and when performing precoding, if a precoding vector of the uplink control signaling is different from a precoding vector of the uplink data, before the terminal performs data processing for the uplink control signaling, the terminal receives the precoding vector of the uplink control signaling, which is notified by the base station dynamically or configured by the higher layer, or, fixes the precoding vector of the uplink control signaling of the terminal to a preset precoding vector.

Step 102: The terminal performs resource mapping separately for the data-processed uplink control signaling and uplink data to obtain a frequency domain signal, where the performing resource mapping separately refers to mapping the data-processed uplink control signaling and uplink data to different resource block groups of a system bandwidth separately, and the resource block group is formed by at least one resource block.

Unlike the prior art in which resource multiplexing is performed for the uplink control signaling and the uplink data, the terminal in the technical solutions of the present invention lets the uplink control signaling and the uplink data be carried in different resource block groups in the system bandwidth, where the resource block group is formed by at least one RB (Resource Block, resource block). For example, a system bandwidth includes two resource block groups: cluster 1 and cluster 2, where cluster 1 is formed by three resource blocks, and cluster 2 is formed by four resource blocks. All uplink control signaling is carried in cluster 1, and all uplink data is carried in cluster 2. In this way, the uplink control signaling and the uplink data are no longer multiplexed to the PRB resources in the same region, but are carried in different regions in the system bandwidth.

Figure 2:
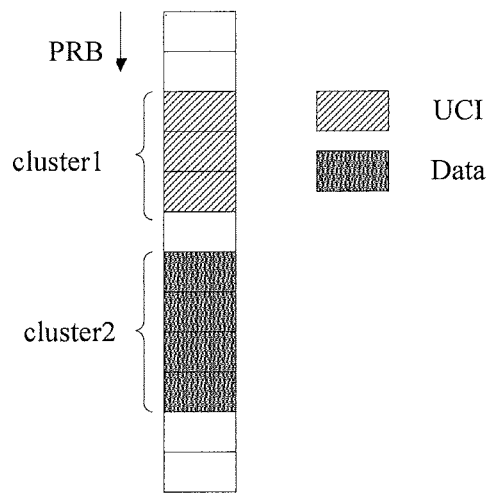
FIG. 2 is a schematic diagram showing distribution of a first resource block group and a second resource block group in a PRB according to the present invention.

FIG. 2 is a schematic diagram showing distribution of a first resource block group and a second resource block group in a PRB according to the present invention. In the prior art, the uplink control signaling and the uplink data are multiplexed in cluster 1 and cluster 2, that is, cluster 1 and cluster 2 carry both the uplink control signaling and the uplink data. Unlike the prior art, the present invention uses one cluster, that is, cluster 1 or cluster 2, for carrying the uplink control signaling, and uses the other cluster for carrying the uplink data.

Figure 3:
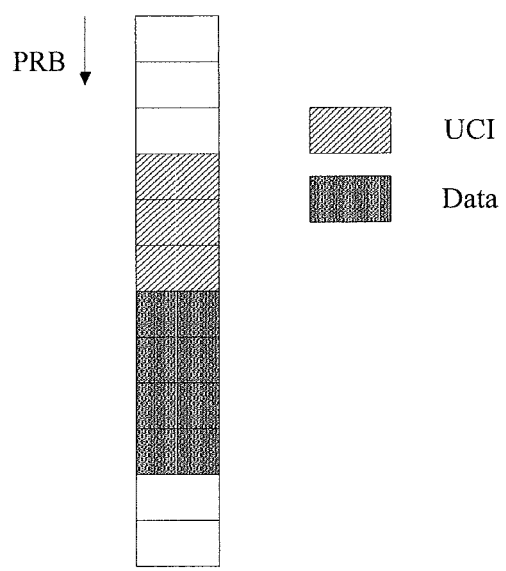
FIG. 3 is another schematic diagram showing distribution of a first resource block group and a second resource block group in a PRB according to the present invention.

It should be noted that the first resource block group carrying the uplink control signaling and the second resource block group carrying the uplink data may be discontinuous in the PRB, as shown in FIG. 2, and may also be continuous, as shown in FIG. 3, which is another schematic diagram showing distribution of a first resource block group and a second resource block group in a PRB according to the present invention. The embodiment of the present invention does not limit the position relationship between the first resource block group and the second resource block group in the PRB.

Preferably, the resource mapping performed by the terminal for the data-processed uplink control signaling and uplink data separately includes: receiving, by the terminal, second control signaling from the base station, where the second control signaling indicates a mapping relationship between the uplink control signaling and uplink data and the different resource block groups in the system bandwidth, or a mapping relationship between the uplink control signaling and uplink data and the different resource block groups in the system bandwidth is configured fixedly on the terminal; and, mapping, by the terminal, the data-processed uplink control signaling and the uplink data to the different resource block groups in the system bandwidth according to the mapping relationship.

Further, preferably, the second control signaling is dynamic signaling or higher layer signaling that includes a mapping identifier, and the mapping identifier indicates the mapping relationship.

When the uplink control signaling and the uplink data are carried in different resource block groups in the system bandwidth and sent, data processing needs to be performed for the uplink control signaling and the uplink data separately.

Step 103: The terminal performs frequency-to-time conversion for the obtained frequency domain signal to obtain a time domain signal, and then sends the signal to the base station. In addition, preferably, in the communication system mentioned in the present invention, all terminals are set fixedly in such a way that the uplink control signaling and the uplink data are carried in different resource block groups in the system bandwidth and sent, so that the uplink control signaling and the uplink data are processed separately. However, at a system upgrade stage, some terminals are set fixedly in such a way that the uplink control signaling and the uplink data are carried in different resource block groups in the system bandwidth and sent, and other terminals are not set fixedly in such a way that the uplink control signaling and the uplink data are carried in different resource block groups in the system bandwidth and sent. In this case, the base station needs to use uplink scheduling signaling to notify a terminal that the uplink control signaling and the uplink data need to be carried in different resource block groups in the system bandwidth and sent, so that the uplink control signaling and the uplink data are processed separately.

In this case, preferably, the terminal receives first control signaling from the base station before performing the resource mapping, where the first control signaling indicates that, the uplink control signaling and the uplink data, which are scheduled by the base station, are carried in different resource block groups in the system bandwidth; and the terminal performs the resource mapping separately as indicated by the first control signaling.

For example, the uplink scheduling signaling sent by the base station to the terminal includes a resource identifier, and the terminal obtains the start position and the size of the two clusters in the system bandwidth according to the resource identifier. Then the terminal may know the specific resource multiplexing mode according to the resource identifier Y. If Y=0, the applied resource multiplexing mode is to let the uplink control signaling and the uplink data be carried in the same resource block group in the system bandwidth; and, if Y=1, the applied resource multiplexing mode is to let the uplink control signaling and the uplink data be carried in different resource block groups in the system bandwidth. The resource multiplexing identifier Y may be higher layer RRC signaling or dynamic signaling.

Generally, at a system transition stage, if the terminal supports carrying the uplink control signaling and the uplink data in different resource block groups in the system bandwidth, the base station sends the first control signaling to the terminal; and, if the terminal does not support carrying the uplink control signaling and the uplink data in different resource block groups in the system bandwidth, the base station does not send the first control signaling to the terminal.

It should be noted that, when the resource identifier in the uplink scheduling signaling indicates that the uplink control signaling and the uplink data are carried in the same resource block group in the system bandwidth, the existing uplink control signaling sending method art is applied, which is not a concern of the present invention and is not detailed herein.

Alternatively, the terminal may determine the resource multiplexing mode implicitly.

Preferably, before the terminal performs the resource mapping, the terminal judges whether the original number of bits of the uplink control signaling is greater than the preset number of bits; and, if yes, the terminal performs the resource mapping separately for the data-processed uplink control signaling and uplink data.

For example, if the original number of bits of the uplink control signaling is greater than the preset number of bits; the applied resource multiplexing mode is to let the uplink control signaling and the uplink data, which are scheduled by the base station, be carried in different resource block groups in the system bandwidth; otherwise, the applied resource multiplexing mode is to let the uplink control signaling and the uplink data, which are scheduled by the base station, be carried in the same resource block group in the system bandwidth.

Also, when the resource identifier in the uplink scheduling signaling indicates that the uplink control signaling and the uplink data are carried in the same resource block group in the system bandwidth, the existing uplink control signaling sending method is applied, which is not a concern of the present invention and is not detailed herein. As can be seen from the above embodiment, on a terminal side, uplink control signaling and uplink data are carried in different resource block groups in a system bandwidth respectively. Based on such a resource allocation mode, the uplink control signaling and the uplink data undergo data processing and resource mapping separately. Therefore, resources of the uplink control signaling and resources of the uplink data are determined separately without depending on each other, which avoids resource nesting and further avoids resource waste caused by the resource nesting.

Embodiment 2

Figure 4:
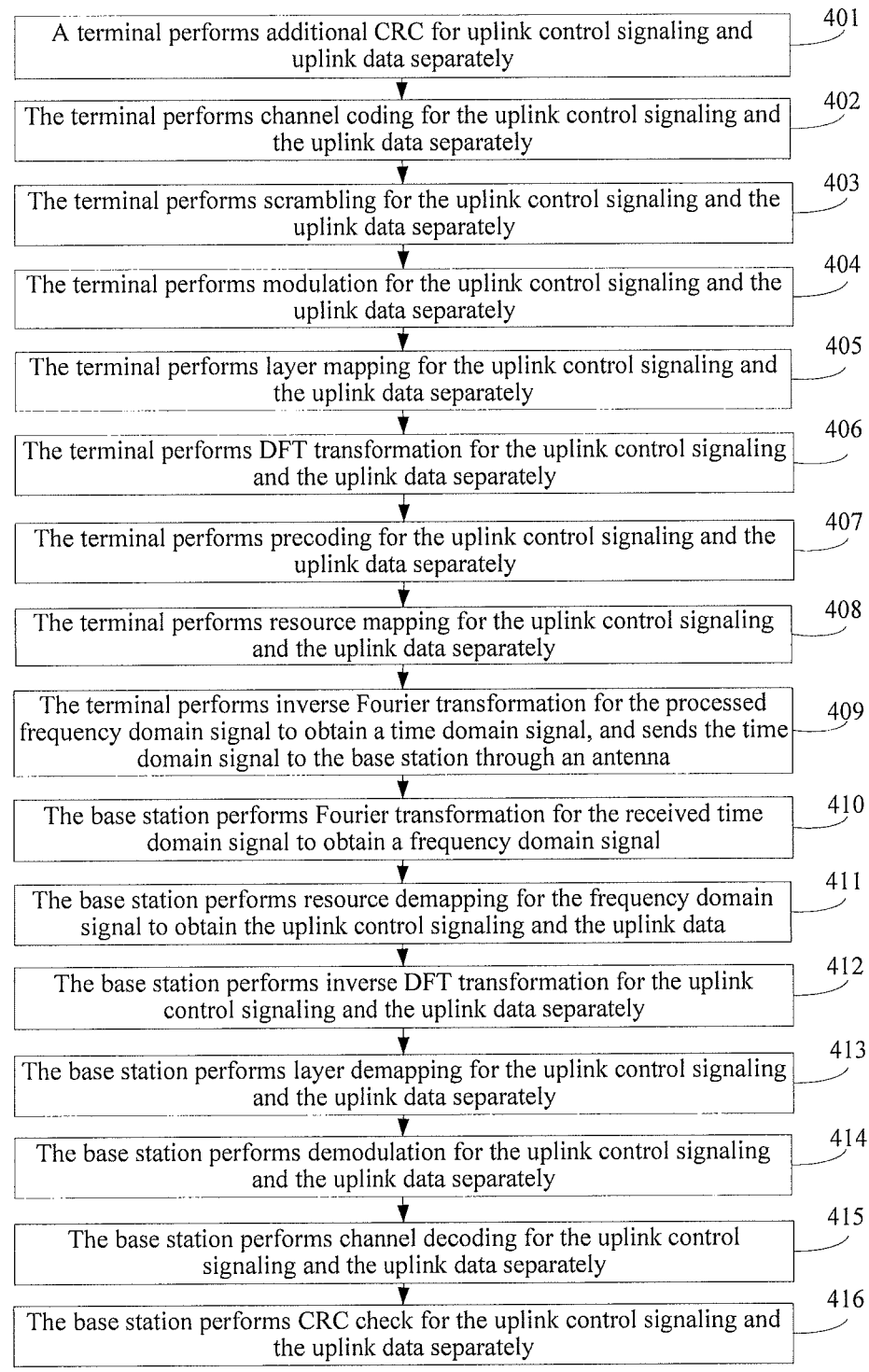
FIG. 4 is a signaling flowchart of another embodiment of a method for sending uplink control signaling according to the present invention.

The following describes a detailed process of performing a series of processing for the uplink control signaling and the uplink data separately in the case that the uplink control signaling and the uplink data are carried in different resource block groups in the system bandwidth and sent. FIG. 4 is a signaling flowchart of another embodiment of a method for transmitting uplink control signaling according to the present invention. The method includes the following steps:

Step 401: A terminal performs additional CRC for uplink control signaling and uplink data separately.

Step 402: The terminal performs channel coding for the uplink control signaling and the uplink data separately.

When performing channel coding, the terminal determines a channel coding rate of the uplink control signaling and a channel coding rate of the uplink data respectively according to the number of REs (Resource Elements, resource elements) in a first resource block group that carries the uplink control signaling and that in a second resource block group that carries the uplink data, where the uplink control signaling and the uplink data are carried in different resource block groups in a PRB and sent, and the resource block group is formed by at least one resource block.

In determining the channel coding rate of the uplink data, if the number of resource blocks in the second resource block group that carries the uplink data is N1 and the number of resource elements except pilots in each resource block is M1, the total number of resource elements carrying the uplink data is $M1*N1$; if the original number of bits of the uplink data is Z1 and the number of layers in the layer mapping is L1, the coding rate of the uplink data is $CR1=Z1/(M1*N1*L1)$.

Similarly, in determining the channel coding rate of the uplink control signaling, if the number of resource blocks in the first resource block group that carries the uplink control signaling is N2 and the number of resource elements except pilots in each resource block is M2, the total number of resource elements carrying the uplink control signaling is $M2*N2$; if the original number of bits of the uplink control signaling is Z2 and the number of layers in the layer mapping is L2, the coding rate of the uplink control signaling is CR2=Z2/(M2*N2*L2).

Step 403: The terminal performs scrambling for the uplink control signaling and the uplink data separately.

One scrambling mode is: The terminal scrambles the uplink control signaling by using an initial value of a second scrambling sequence different from an initial value of a first scrambling sequence applied in scrambling the uplink data, where the initial value of the second scrambling sequence is greater than the initial value of the first scrambling sequence by one offset.

For example, the original data stream of the uplink control signaling is b(i), i=0~L1−1, and the original data stream of the uplink data is d(i), i=1~L2−1. After scrambling, the processed data stream of the uplink control signaling is: $b^{(q)}(i)=(b^{(q)}(i)+c_2^{(q)}(i))\mod 2$, i=0, 1 ... L2−1, and the processed data stream of the uplink data is $d-(i)=(d-(i)+c_1-(i))\mod 2$, i=0, 1, L1−1, where $c_2^{(q)}(i)$ is a second scrambling sequence used in scrambling the uplink control signaling, $c_2^{(q)}(i)$ is a PN sequence, $c_1^{(p)}(i)$ is a first scrambling sequence used in scrambling the uplink data, $c_1^{(p)}(i)$ is also a PN sequence, and q is a mark number of an uplink control signaling codeword.

If the initial value of the first scrambling sequence of the uplink data is $c_{init\_1}=n_{RNTI}\cdot2^{14}+q\cdot2^{13}+\lfloor n_s/2\rfloor\cdot2^9+N_{ID}^{cell}$, the initial value of the second scrambling sequence of the uplink control signaling is $c_{init\_1}=n_{RNTI}\cdot2^{14}+q\cdot2^{13}+\lfloor n_s/2^9+N_{ID}^{cell}+(X+9)*2^9$. X is an offset from the initial value of the second scrambling sequence to the initial value of the first scrambling sequence.

Preferably, 1≤X≤6, and X is a positive integer. The offset may be notified by the base station dynamically or configured dynamically for the terminal in each transmission, or an arbitrary X value is configured on the terminal fixedly.

Another mode is: The terminal compares a data stream length of the uplink control signaling with a data stream length of the uplink data, and if the data stream length of the uplink data is greater than the data stream length of the uplink control signaling, the terminal intercepts a scrambling sequence of the uplink control signaling from a scrambling sequence of the uplink data, and if the data stream length of the uplink control signaling is greater than the data stream length of the uplink data, the terminal intercepts the scrambling sequence of the uplink data from the scrambling sequence of the uplink control signaling, where initial values of the scrambling sequences of the uplink control signaling and the uplink data are the same.

For example, if L2>L1, a sequence whose length is L1 is intercepted from the second scrambling sequence $c_2^{(q)}(i)$, and the intercepted sequence is used as a second scrambling sequence $c_1^{(p)}(i)$.

It should be noted that: if the data stream length of the uplink control signaling is greater than the data stream length of the uplink data, a first scrambling sequence of the uplink data may be intercepted arbitrarily from a second scrambling sequence of the uplink control signaling, and, if the data stream length of the uplink data is greater than the data stream length of the uplink control signaling, the second scrambling sequence of the uplink control signaling may be intercepted arbitrarily from the first scrambling sequence of the uplink data.

Step 404: The terminal performs modulation for the uplink control signaling and the uplink data separately.

In the modulation process, the modulation mode of the uplink control signaling may be the same as or different from the modulation mode of the uplink data. If the modulation modes are different, the modulation mode of the uplink control signaling needs to be notified by the base station dynamically to the terminal in each transmission or configured by a higher layer, or, the modulation mode of the uplink control signaling of the terminal is fixed to a preset modulation mode such as any one of QPSK, 16QAM, and 64QAM.

Step 405: The terminal performs layer mapping for the uplink control signaling and the uplink data separately.

When performing the layer mapping, the terminal maps the uplink control signaling and the uplink data to different layers of respective codewords.

For example, in the prior art, because resource multiplexing is required for the uplink control signaling and the uplink data, assuming that the number of layers of mapping is 4, both the uplink control signaling and the uplink data are mapped to layer 1, layer 2, layer 3, and layer 4 of a PUSCH codeword. However, in the layer mapping according to the present invention, assuming that the number of layers of mapping of both the uplink data and the uplink control signaling is 2, the uplink control signaling is mapped to layer 1 and layer 2, and the uplink data is mapped to layer 3 and layer 4.

The number of layers of mapping of the uplink control signaling may be the same as or different from the number of layers of mapping of the uplink data. If different, the terminal receives the number of layers of the uplink control signaling in each transmission, where the number of layers is notified by the base station dynamically or configured by a higher layer, or, fixes the number of layers of the uplink control signaling of the terminal to a preset number of layers.

For example, the number of layers of the uplink control signaling may be set to 1, 2, 4, or 8 fixedly, or, the number of layers of the uplink control signaling may be fixedly set to be the number of layers of a codeword with the largest transport block or the largest number of layers in the PUSCH.

Step 406: The terminal performs linear transformation for the uplink control signaling and the uplink data separately.

When linear transformation is performed, a target length of the transformed uplink control signaling is the number of frequency domain subcarriers in a resource block group used for carrying the uplink control signaling, and a target length of the transformed uplink data is the number of frequency domain subcarriers in a resource block group used for carrying the uplink data.

For example, the number of resource blocks in a resource block group that carries the uplink control signaling is 4. Because each resource block includes 12*14 REs, the number of REs in each column in a resource block is 12, and accordingly the target length of the transformed uplink control signaling is 4*12=48.

Step 407: The terminal performs precoding for the uplink control signaling and the uplink data separately.

In the precoding, a precoding vector of the uplink control signaling may be the same as or different from a precoding vector of the uplink data.

Preferably, if the precoding vector of the uplink control signaling is different from the precoding vector of the uplink data, then in each transmission, the terminal receives the precoding vector of the uplink control signaling, which is notified by the base station dynamically or configured by the higher layer, or, fixes the precoding vector of the uplink control signaling of the terminal to a preset precoding vector.

Step 408: The terminal performs resource mapping for the uplink control signaling and the uplink data separately.

The terminal may pre-configure the mapping relationship between the uplink control signaling and uplink data and the different resource block groups in the system bandwidth, for example, pre-configure the first resource block group to carry the uplink control signaling and the second resource block group to carry the uplink data. Alternatively, on each occasion of uplink scheduling, the base station uses control signaling to notify the terminal of the mapping relationship between the uplink control signaling and uplink data and the different resource block groups in the system bandwidth, and for example, indicate in the control signaling that the first resource block group carries the uplink control signaling and that the second resource block group carries the uplink data.

It should be noted that the first resource block group and the second resource block group do not strictly correspond to cluster 1 and cluster 2 in the system bandwidth, and that the first resource block group may be cluster 1 in the system bandwidth or cluster 2 in the system bandwidth. Definitely, if the first resource block group is cluster 1 in the system bandwidth, the second resource block group is cluster 2 in the system bandwidth; conversely, if the first resource block group is cluster 2 in the system bandwidth, the second resource block group is cluster 1 in the system bandwidth. In addition, in the system bandwidth, apart from cluster 1 and cluster 2 that may be used as resource block groups for carrying the uplink control signaling and the uplink data respectively, other resource spaces in the system bandwidth may be used as resource block groups for carrying the uplink control signaling and the uplink data respectively.

Therefore, preferably, when performing the resource mapping, the terminal receives dynamic signaling or higher layer signaling carrying a mapping identifier from the base station, where the mapping identifier indicates that the terminal maps the uplink control signaling to the first resource block group and maps the uplink data to the second resource block group.

Alternatively, when the resource mapping is performed, a mapping relationship is configured on the terminal fixedly, where the mapping relationship indicates that the terminal maps the uplink control signaling to the first resource block group and maps the uplink data to the second resource block group.

Further, preferably, the first resource block group is cluster 1 in the system bandwidth, and the second resource block group is cluster 2 in the system bandwidth; or, the first resource block group is cluster 2 in the system bandwidth, and the second resource block group is cluster 1 in the system bandwidth.

For example, as shown in FIG. 2, if cluster 1 in the system bandwidth is used to carry the uplink control signaling and cluster 2 is used to carry the uplink data, the terminal maps the uplink control signaling to cluster 1 and maps the uplink data to cluster 2.

The mapping relationship between the uplink control signaling and uplink data and the two clusters in the system bandwidth may be indicated in signaling. For example, dynamic signaling or higher layer RRC signaling includes a mapping identifier Z. If Z=0, the uplink control signaling is mapped to cluster 1, and the uplink data is mapped to cluster 2; if Z=1, the uplink control signaling is mapped to cluster 2, and the uplink data is mapped to cluster 1.

Alternatively, the uplink control signaling is mapped to cluster 1 or cluster 2 fixedly. Preferably, the uplink control signaling may be mapped to a cluster with a smaller bandwidth in the two clusters fixedly, and, if the two clusters have equal bandwidths, mapped to cluster 1 or cluster 2 fixedly.

Step 409: The terminal performs inverse Fourier transformation for the processed frequency domain signal to obtain a time domain signal, and sends the time domain signal to the base station through an antenna.

Step 410: The base station performs Fourier transformation for the received time domain signal to obtain a frequency domain signal.

Step 411: The base station performs resource demapping for the frequency domain signal to obtain the uplink control signaling and the uplink data.

Step 412: The base station performs inverse DFT transformation for the uplink control signaling and the uplink data separately.

Step 413: The base station performs layer demapping for the uplink control signaling and the uplink data separately.

Step 414: The base station performs demodulation for the uplink control signaling and the uplink data separately.

Step 415: The base station performs channel decoding for the uplink control signaling and the uplink data separately.

Step 416: The base station performs CRC check for the uplink control signaling and the uplink data separately.

The base station processes the received signal according to a process inverse to a series of processing performed by the terminal. The series of processing performed by the terminal has been detailed in steps 401 to 409, and therefore is not repeated in steps 410 to 416.

As can be seen from the above embodiment, on a terminal side, uplink control signaling and uplink data are carried in different resource block groups in a system bandwidth respectively. Based on such a resource allocation mode, the uplink control signaling and the uplink data undergo data processing and resource mapping separately. Therefore, resources of the uplink control signaling and resources of the uplink data are determined separately without depending on each other, which avoids resource nesting and further avoids resource waste caused by the resource nesting.

Embodiment 3

Figure 5:
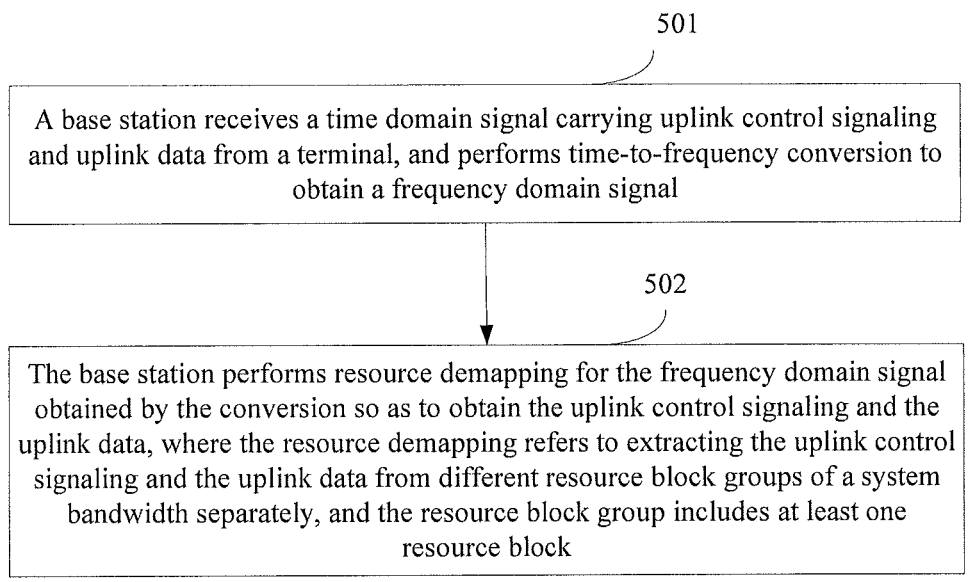
FIG. 5 is a flowchart of an embodiment of a method for receiving uplink control signaling according to the present invention.

Corresponding to the method for sending uplink control signaling, an embodiment of the present invention further provides a method for receiving uplink control signaling. FIG. 5 is a flowchart of an embodiment of a method for receiving uplink control signaling according to the present invention. The method includes the following steps:

Step 501: A base station receives a time domain signal including uplink control signaling and uplink data from a terminal, and performs time-to-frequency conversion to obtain a frequency domain signal.

Step 502: The base station performs resource demapping for the frequency domain signal obtained by the conversion so as to obtain the uplink control signaling and the uplink data, where the resource demapping refers to extracting the uplink control signaling and the uplink data from different resource block groups of a system bandwidth separately, and the resource block group is formed by at least one resource block.

Preferably, in the communication system mentioned in the present invention, all terminals are set fixedly in such a way that the uplink control signaling and the uplink data are carried in different resource block groups in the system bandwidth and sent, so that the uplink control signaling and the uplink data are processed separately. However, at a system upgrade stage, some terminals are set fixedly in such a way that the uplink control signaling and the uplink data are carried in different resource block groups in the system bandwidth and sent, and other terminals are not set fixedly in such a way that the uplink control signaling and the uplink data are carried in different resource block groups in the system bandwidth and sent. In this case, the base station needs to use uplink scheduling signaling to notify a terminal that the uplink control signaling and the uplink data need to be carried in different resource block groups in the system bandwidth and sent, so that the uplink control signaling and the uplink data are processed separately.

In this case, preferably, before the base station receives the time domain signal from the terminal, the base station sends first control signaling to the terminal, where the first control signaling indicates that, the uplink control signaling and the uplink data, which are scheduled by the base station, are carried in different resource block groups in the system bandwidth, so that the terminal performs resource mapping separately for the data-processed uplink control signaling and uplink data as indicated by the first control signaling.

Because the uplink control signaling and the uplink data are carried in different resource block groups in the system bandwidth separately, the mapping relationship between the uplink control signaling and uplink data and the resource block groups may be configured on the terminal side fixedly, or may be indicated by the base station through control signaling.

When the mapping relationship is indicated by the base station through the control signaling, preferably, before the base station receives the time domain signal from the terminal, the base station sends second control signaling to the terminal, where the second control signaling indicates the mapping relationship between the uplink control signaling and uplink data and the different resource block groups in the system bandwidth.

Further, preferably, the second control signaling is dynamic signaling or higher layer signaling that includes a mapping identifier, and the mapping identifier indicates the mapping relationship.

When the uplink control signaling and the uplink data are carried in different resource block groups in the system bandwidth and sent, after the resource demapping, data processing may be performed for the uplink control signaling and the uplink data separately. In the process of receiving the uplink control signaling, the data processing at least includes any one or any combination of linear inverse transformation, layer demapping, demodulation, descrambling, channel decoding, and CRC check processing.

It should be noted that the processing steps and order included in the data processing in the present invention are the same as the processing steps and order included in the data processing performed for sending uplink control signaling in the prior art. Because the processing steps and processing orders included in different types of data processing in the prior art are different from each other, the present invention does not limit the entire data processing process, but is applicable so long as uplink control signaling and uplink data scheduled by the base station undergo data processing separately and so long as the data processing process in receiving the uplink control signaling corresponds to the data processing process in sending the uplink control signaling.

In addition, corresponding to the additional CRC processing, because the terminal performs CRC check for the uplink control signaling and the uplink data separately in the prior art, in the technical solutions of the present invention, the terminal still performs CRC check processing for the uplink control signaling and the uplink data separately according to the prior art.

Preferably, when performing linear inverse transformation, the base station performs linear inverse transformation for the uplink control signaling whose length before the transformation is the number of frequency domain subcarriers in a resource block group used for carrying the uplink control signaling, and the uplink data whose length before the transformation is the number of frequency domain subcarriers in a resource block group used for carrying the uplink data, respectively;

when performing layer demapping, the base station performs layer demapping for the uplink control signaling and the uplink data at different layers of respective codewords, where if the number of layers of the uplink control signaling is different from the number of layers of the uplink data, the number of layers of the uplink control signaling subjected to layer demapping by the base station is the number of layers dynamically notified by the base station or configured by a higher layer to the terminal for layer mapping, or, the number of layers of the uplink control signaling subjected to layer demapping by the base station is fixed to a preset number of layers;

when demodulation is performed, if a demodulation mode of the uplink control signaling is different from a demodulation mode of the uplink data, the demodulation mode of the uplink control signaling is configured by the base station dynamically or configured by the higher layer, or the demodulation is performed in a preset demodulation mode;

when performing descrambling, the base station descrambles the uplink control signaling with an initial value of a scrambling sequence different from an initial value of a scrambling sequence of the uplink data, where the initial value of the scrambling sequence of the uplink control signaling is greater than the initial value of the scrambling sequence of the uplink data by one offset; or, if a data stream length of the uplink data is greater than a data stream length of the uplink control signaling, a scrambling sequence of the uplink control signaling is intercepted from a scrambling sequence of the uplink data, and if the data stream length of the uplink control signaling is greater than the data stream length of the uplink data, the scrambling sequence of the uplink data is intercepted from the scrambling sequence of the uplink control signaling, where initial values of the scrambling sequences of the uplink control signaling and the uplink data are the same; and when performing channel decoding, the base station performs channel decoding for the uplink control signaling whose channel coding rate is determined according to the number of resource elements REs in a first resource block group that carries the uplink control signaling, and the uplink data whose channel coding rate is determined according to the number of resource elements REs in a second resource block group that carries the uplink data, respectively.

As can be seen from the above embodiment, on a base station side, resource demapping and data processing are performed for uplink control signaling and uplink data separately. Therefore, resources of the uplink control signaling and resources of the uplink data are determined separately without depending on each other, which avoids resource nesting and further avoids resource waste caused by the resource nesting.

Embodiment 4

Figure 6:
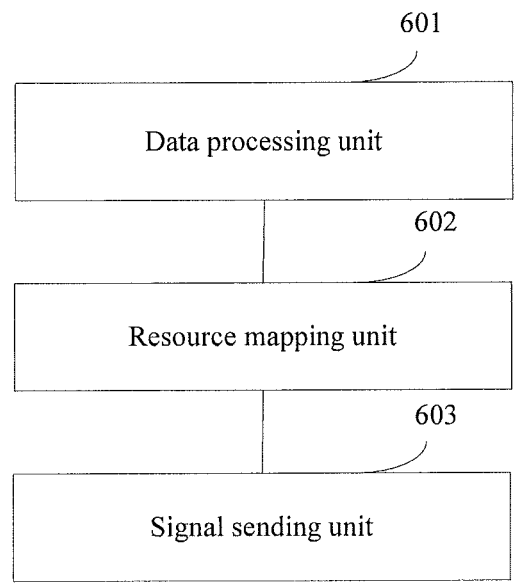
FIG. 6 is a structural diagram of an embodiment of a terminal according to the present invention.

Apart from the foregoing method, an embodiment of the present invention further provides a terminal for sending uplink control signaling. FIG. 6 is a structural diagram of an embodiment of a terminal according to the present invention. The terminal includes a data processing unit 601, a resource mapping unit 602, and a signal sending unit 603. The following describes the internal structure and connection relationship of the terminal in detail with reference to working principles of a base station controller.

The data processing unit 601 is configured to perform data processing separately for uplink control signaling and uplink data that are scheduled by a base station.

The resource mapping unit 602 is configured to perform resource mapping separately for the uplink control signaling and the uplink data that are processed by the data processing unit 601, so as to obtain a frequency domain signal, where the performing resource mapping separately refers to mapping the data-processed uplink control signaling and uplink data to different resource block groups of a system bandwidth separately, and the resource block group is formed by at least one resource block.

The signal sending unit 603 is configured to perform frequency-to-time conversion for the frequency domain signal obtained by the resource mapping unit 602 to obtain a time domain signal, and then send the signal to the base station.

Figure 7:
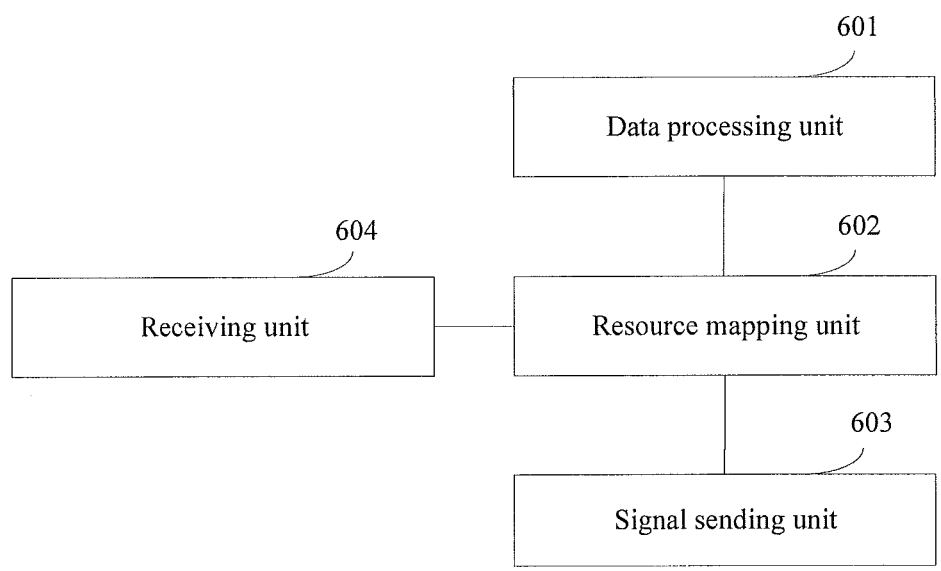
FIG. 7 is a structural diagram of another embodiment of a terminal according to the present invention.

In addition to the structure shown in FIG. 6, preferably, referring to FIG. 7, which is a flowchart of another embodiment of a terminal for sending uplink control signaling according to the present invention, the terminal further includes: a receiving unit 604, configured to receive first control signaling from the base station before the terminal performs the resource mapping, where the first control signaling indicates that, the uplink control signaling and the uplink data, which are scheduled by the base station, are carried in different resource block groups in the system bandwidth. Therefore, the resource mapping unit 602 is configured to perform resource mapping separately for the data-processed uplink control signaling and uplink data according to information indicated in the first control signaling received by the receiving unit 604.

In addition, the receiving unit 604 may be replaced with an identifying unit 605 configured to identify whether the original number of bits of the uplink control signaling is greater than a preset number of bits, and therefore, the resource mapping unit 602 is configured to perform the resource mapping separately when the identifying unit 605 identifies that the original number of bits of the uplink control signaling is greater than the preset number of bits.

Figure 8:
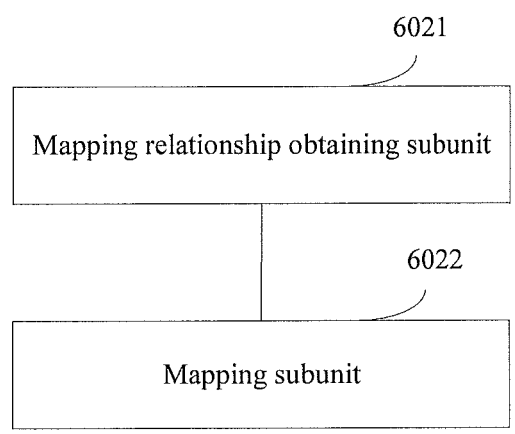
FIG. 8 is a structural diagram of a resource mapping unit according to the present invention.

Preferably, referring to FIG. 8, which is a structural diagram of a resource mapping unit according to the present invention, the resource mapping unit 602 includes: a mapping relationship obtaining subunit 6021 and a mapping subunit 6022.

The mapping relationship obtaining subunit 6021 is configured to obtain, from second control signaling received by the receiving unit from the base station, a mapping relationship between the uplink control signaling and uplink data and the different resource block groups in the system bandwidth, or, obtain a mapping relationship between the uplink control signaling and uplink data and the different resource block groups in the system bandwidth, which is configured fixedly on the terminal.

The mapping subunit 6022 is configured to map the data-processed uplink control signaling and uplink data to the different resource block groups in the system bandwidth according to the mapping relationship obtained by the mapping relationship obtaining subunit.

Further, preferably, the second control signaling is dynamic signaling or higher layer signaling that includes a mapping identifier, and the mapping identifier indicates the mapping relationship.

In addition, the data processing unit 601 is configured to perform data processing separately for the uplink control signaling and the uplink data that are scheduled by the base station, where the data processing includes any one or any combination of the following: additional cyclic redundancy check CRC, channel coding, scrambling, modulation, layer mapping, linear transformation, and precoding.

The additional CRC is performed by an additional CRC subunit, the channel coding is performed by a channel coding subunit, the scrambling is performed by a scrambling subunit, the modulation is performed by a modulation subunit, the layer mapping is performed by a layer mapping subunit, the linear transformation is performed by a linear transformation subunit, and the precoding is performed by a precoding subunit.

Figure 9:
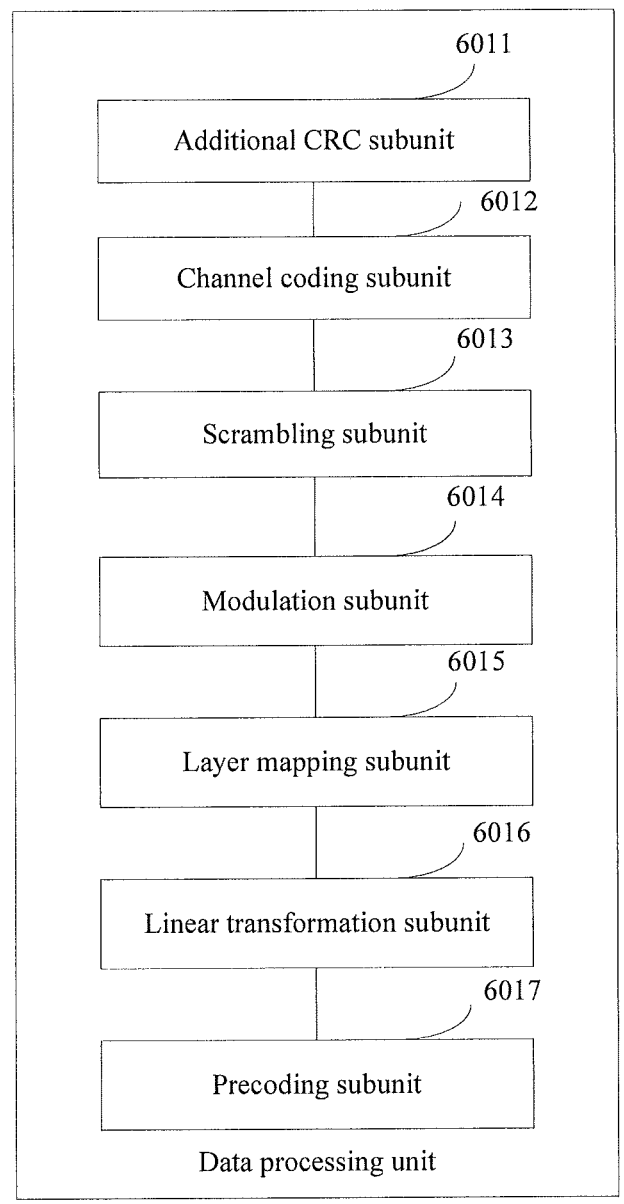
FIG. 9 is a structural diagram of a data processing unit according to the present invention.

Preferably, referring to FIG. 9, which is a structural diagram of a data processing unit according to the present invention, the data processing unit 601 includes an additional CRC subunit 6011, a channel coding subunit 6012, a scrambling subunit 6013, a modulation subunit 6014, a layer mapping subunit 6015, a linear transformation subunit 6016, and a precoding subunit 6017.

The channel coding subunit is configured to determine a channel coding rate of the uplink control signaling and a channel coding rate of the uplink data respectively according to the number of resource elements REs in a first resource block group that carries the uplink control signaling and that in a second resource block group that carries the uplink data.

The scrambling subunit is configured to scramble the uplink control signaling by using an initial value of a second scrambling sequence different from an initial value of a first scrambling sequence applied in scrambling the uplink data, where the initial value of the second scrambling sequence is greater than the initial value of the first scrambling sequence by one offset; or, compare a data stream length of the uplink control signaling with a data stream length of the uplink data, and if the data stream length of the uplink data is greater than the data stream length of the uplink control signaling, intercept a scrambling sequence of the uplink control signaling from a scrambling sequence of the uplink data, and if the data stream length of the uplink control signaling is greater than the data stream length of the uplink data, intercept the scrambling sequence of the uplink data from the scrambling sequence of the uplink control signaling, where initial values of the scrambling sequences of the uplink control signaling and the uplink data are the same.

The modulation subunit is configured to: if a modulation mode of the uplink control signaling is different from a modulation mode of the uplink data, before the terminal performs data processing for the uplink control signaling, receive the modulation mode of the uplink control signaling, which is notified by the base station dynamically or configured by a higher layer, or, fix the modulation mode of the uplink control signaling of the terminal to a preset modulation mode.

The layer mapping subunit is configured to: map the uplink control signaling and the uplink data to different layers of respective codewords; if the number of layers of the uplink control signaling is different from the number of layers of the uplink data, before the terminal performs data processing for the uplink control signaling, receive the number of layers of the uplink control signaling, which is notified by the base station dynamically or configured by the higher layer, or, fix the number of layers of the uplink control signaling of the terminal to a preset number of layers.

The linear transformation subunit is configured to set a target length of the transformed uplink control signaling to the number of frequency domain subcarriers in a resource block group used for carrying the uplink control signaling, and set a target length of the transformed uplink data to the number of frequency domain subcarriers in a resource block group used for carrying the uplink data.

The precoding subunit is configured to: if a precoding vector of the uplink control signaling is different from a precoding vector of the uplink data, before the terminal performs data processing for the uplink control signaling, receive the precoding vector of the uplink control signaling, which is notified by the base station dynamically or configured by the higher layer, or, fix the precoding vector of the uplink control signaling of the terminal to a preset precoding vector.

As can be seen from the above embodiment, on a terminal side, uplink control signaling and uplink data are carried in different resource block groups in a PRB respectively. Based on such a resource allocation mode, the uplink control signaling and the uplink data undergo data processing and resource mapping separately. Therefore, resources of the uplink control signaling and resources of the uplink data are determined separately without depending on each other, which avoids resource nesting and further avoids resource waste caused by the resource nesting.

Embodiment 5

Figure 10:
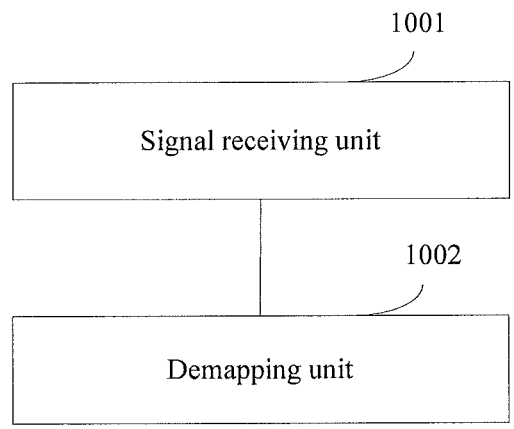
FIG. 10 is a structural diagram of an embodiment of a base station according to the present invention.

Apart from the foregoing method, an embodiment of the present invention further provides a base station for receiving uplink control signaling. FIG. 10 is a structural diagram of an embodiment of a base station according to the present invention. The base station includes a signal receiving unit 1001 and a demapping unit 1002. The following describes the internal structure and connection relationship of the base station in detail with reference to working principles of a base station controller.

The signal receiving unit 1001 is configured to receive a time domain signal including uplink control signaling and uplink data from a terminal, and perform time-to-frequency conversion for the received time domain signal to obtain a frequency domain signal.

The demapping unit 1002 is configured to perform resource demapping for the frequency domain signal obtained by the conversion by the signal receiving unit so as to obtain the uplink control signaling and the uplink data, where the resource demapping refers to extracting the uplink control signaling and the uplink data from different resource block groups of a system bandwidth, and the resource block group is formed by at least one resource block.

In addition to the structure shown in FIG. 10, preferably, the base station further includes a first signaling sending unit, configured to send first control signaling to the terminal, where the first control signaling indicates that, the uplink control signaling and the uplink data, which are scheduled by the base station, are carried in different resource block groups in the system bandwidth, so that the terminal performs resource mapping separately for the data-processed uplink control signaling and uplink data as indicated by the first control signaling.

Alternatively, preferably, the base station may further include a second signaling sending unit, configured to send second control signaling to the terminal, where the second control signaling indicates a mapping relationship between the uplink control signaling and uplink data and the different resource block groups in the system bandwidth.

Further, preferably, the second control signaling is dynamic signaling or higher layer signaling that includes a mapping identifier, and the mapping identifier indicates the mapping relationship.

Figure 11:
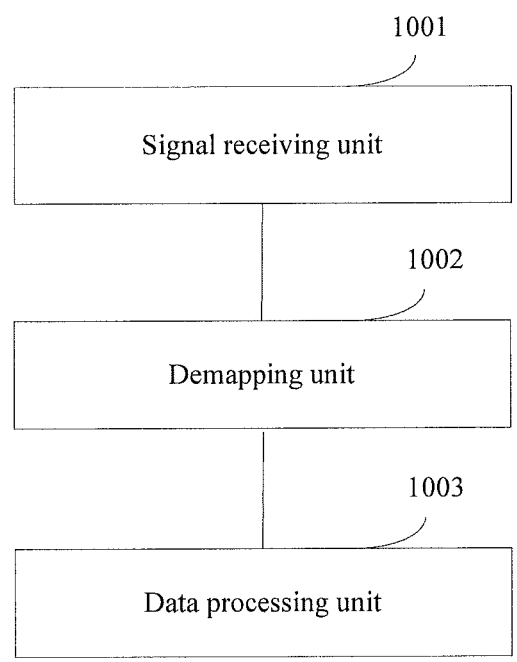
FIG. 11 is a structural diagram of another embodiment of a base station according to the present invention.

In addition, referring to FIG. 11, which is a structural diagram of another embodiment of a base station according to the present invention, the base station further includes a data processing unit 1003, configured to perform data processing separately for the uplink control signaling and the uplink data that are obtained by the demapping unit, where the data processing at least includes any one or any combination of linear inverse transformation, layer demapping, demodulation, descrambling, channel decoding, and CRC check processing.

Preferably, the linear inverse transformation is performed by a linear inverse transformation subunit, the layer demapping is performed by a layer demapping subunit, the demodulation is performed by a demodulation subunit, the descrambling is performed by a descrambling subunit, and the channel decoding is performed by a channel decoding subunit.

The linear inverse transformation subunit is configured to perform linear inverse transformation for the uplink control signaling whose length before the transformation is the number of frequency domain subcarriers in a resource block group used for carrying the uplink control signaling, and the uplink data whose length before the transformation is the number of frequency domain subcarriers in a resource block group used for carrying the uplink data, respectively.

The layer demapping subunit is configured to perform layer demapping for the uplink control signaling and the uplink data at different layers of respective codewords, where if the number of layers of the uplink control signaling is different from the number of layers of the uplink data, the number of layers of the uplink control signaling subjected to layer demapping by the base station is the number of layers dynamically notified by the base station or configured by a higher layer to the terminal for layer mapping, or, the number of layers of the uplink control signaling subjected to layer demapping by the base station is fixed to a preset number of layers.

The demodulation subunit is configured to: if a demodulation mode of the uplink control signaling is different from a demodulation mode of the uplink data, perform demodulation for the uplink control signaling in a demodulation mode configured by the base station dynamically or configured by the higher layer, or perform demodulation in a preset demodulation mode.

The descrambling subunit is configured to descramble the uplink control signaling with an initial value of a scrambling sequence different from an initial value of a scrambling sequence of the uplink data, where the initial value of the scrambling sequence of the uplink control signaling is greater than the initial value of the scrambling sequence of the uplink data by one offset; or, if a data stream length of the uplink data is greater than a data stream length of the uplink control signaling, intercept a scrambling sequence of the uplink control signaling from a scrambling sequence of the uplink data, and if the data stream length of the uplink control signaling is greater than the data stream length of the uplink data, intercept the scrambling sequence of the uplink data from the scrambling sequence of the uplink control signaling, where initial values of the scrambling sequences of the uplink control signaling and the uplink data are the same.

The channel decoding subunit is configured to perform channel decoding for the uplink control signaling whose channel coding rate is determined according to the number of resource elements REs in a first resource block group that carries the uplink control signaling, and the uplink data whose channel coding rate is determined according to the number of resource elements REs in a second resource block group that carries the uplink data, respectively.

As can be seen from the above embodiment, on a base station side, resource demapping and data processing are performed for uplink control signaling and uplink data separately. Therefore, resources of the uplink control signaling and resources of the uplink data are determined separately without depending on each other, which avoids resource nesting and further avoids resource waste caused by the resource nesting.

It may be clearly understood by a person skilled in the art that, for the purpose of convenient and brief description, for a detailed working process of the foregoing system, apparatus, and unit, reference may be made to the corresponding processes in the foregoing method embodiments, which are not described herein again.

In the several embodiments provided in the present invention, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

It should be noted that a person of ordinary skill in the art should understand that all or part of the processes of the methods in the foregoing embodiments may be implemented by a computer program instructing relevant hardware. The program may be stored in a computer readable storage medium. When the program runs, it may include the processes of the methods in the foregoing embodiments. The storage medium may be a magnetic disk, an optical disk, a read-only memory (Read-Only Memory, ROM), or a random access memory (Read-Only Memory, RAM).

Methods and related devices for sending and receiving uplink control signaling according to the present invention are described in detail above. Although the principles and implementation manners of the present invention are described with reference to specific embodiments, the embodiments are only intended to help understand the methods and core idea of the present invention. In addition, a person of ordinary skill in the art may make modifications to the specific implementation manners and application scopes according to the idea of the present invention. In conclusion, the specification shall not be construed as a limitation to the present invention.

What is claimed is:

1. A method of a terminal for sending uplink control signaling, comprising:

performing, by the terminal, data processing separately for uplink control signaling and uplink data that are scheduled by a base station;

performing, by the terminal, resource mapping separately for the data-processed uplink control signaling and uplink data to obtain a frequency domain signal by separately mapping the data-processed uplink control signaling and uplink data to different resource block groups of a system bandwidth separately, each resource block group comprising at least one resource block such that the different resource block groups do not share common resource blocks, each resource block comprising a fixed number of consecutive subcarrier frequencies and a slot comprising a plurality of symbols, and each symbol having a duration of at least a reciprocal of a bandwidth of the subcarrier; and performing, by the terminal, frequency-to-time conversion for the obtained frequency domain signal to obtain a time domain signal, and then sending the time domain signal to the base station, wherein:

when performing channel coding, the terminal determines a channel coding rate of the uplink control signaling and a channel coding rate of the uplink data respectively according to a number of resource elements (REs) in a first resource block group that carries the uplink control signaling and that in a second resource block group that carries the uplink data;

when performing scrambling, the terminal scrambles the uplink control signaling by using an initial value of a second scrambling sequence different from an initial value of a first scrambling sequence applied in scrambling the uplink data, wherein the initial value of the second scrambling sequence is greater than the initial value of the first scrambling sequence by one offset; or, the terminal compares a data stream length of the uplink control signaling with a data stream length of the uplink data, and if the data stream length of the uplink data is greater than the data stream length of the uplink control signaling, the terminal intercepts a scrambling sequence of the uplink control signaling from a scrambling sequence of the uplink data, and if the data stream length of the uplink control signaling is greater than the data stream length of the uplink data, the terminal intercepts the scrambling sequence of the uplink data from the scrambling sequence of the uplink control signaling, wherein initial values of the scrambling sequences of the uplink control signaling and the uplink data are the same;

when performing layer mapping, the terminal maps the uplink control signaling and the uplink data to different layers of respective codewords; if a number of layers of the uplink control signaling is different from a number of layers of the uplink data, before the terminal performs data processing for the uplink control signaling, the terminal receives the number of layers of the uplink control signaling, which is notified by the base station dynamically or configured by the higher layer, or, fixes the number of layers of the uplink control signaling of the terminal to a preset number of layers;

when performing precoding, if a precoding vector of the uplink control signaling is different from a precoding vector of the uplink data, before the terminal performs data processing for the uplink control signaling, the terminal receives the precoding vector of the uplink control signaling, which is notified by the base station dynamically or configured by the higher layer, or, fixes the precoding vector of the uplink control signaling of the terminal to a preset precoding vector.

2. The method according to claim 1, further comprising:
receiving, by the terminal, first control signaling from the base station before performing the resource mapping, wherein the first control signaling indicates that, the uplink control signaling and the uplink data, which are scheduled by the base station, are carried in different resource block groups in the system bandwidth; and
performing, by the terminal, the resource mapping separately as indicated by the first control signaling.

3. The method according to claim 1, further comprising:
performing, by the terminal, the resource mapping separately when an original number of bits of the uplink control signaling is greater than a preset number of bits.

4. The method according to claim 1, wherein the performing, by the terminal, resource mapping separately for the data-processed uplink control signaling and uplink data, comprises:
receiving, by the terminal, second control signaling from the base station, wherein the second control signaling indicates a mapping relationship between the uplink control signaling and uplink data and the different resource block groups in the system bandwidth, or a mapping relationship between the uplink control signaling and uplink data and the different resource block groups in the system bandwidth is configured fixedly on the terminal; and
mapping, by the terminal, the data-processed uplink control signaling and uplink data to the different resource block groups in the system bandwidth according to the mapping relationship.

5. The method according to claim 4, wherein the second control signaling is dynamic signaling or higher layer signaling that comprises a mapping identifier, and the mapping identifier indicates the mapping relationship.

6. The method according to claim 1, wherein the data processing at least comprises any one or any combination of additional cyclic redundancy check (CRC), the channel coding, the scrambling, modulation, the layer mapping, linear transformation and the precoding.

7. The method according to claim 6, wherein:
when performing modulation, if a modulation mode of the uplink control signaling is different from a modulation mode of the uplink data, before the terminal performs data processing for the uplink control signaling, the terminal receives the modulation mode of the uplink control signaling, which is notified by the base station dynamically or configured by a higher layer, or, fixes the modulation mode of the uplink control signaling of the terminal to a preset modulation mode, and
when linear transformation is performed on the uplink control signaling and the uplink data, a target length of the linearly transformed uplink control signaling is a number of frequency domain subcarriers in a resource block group used for carrying the uplink control signaling, and a target length of the linearly transformed uplink data is the number of frequency domain subcarriers in a resource block group used for carrying the uplink data.

8. A terminal, comprising: at least one hardware processor; a memory interfaced to the at least one processor and including instructions executable by the at least one processor to implement:
a data processing unit, configured to perform data processing separately for uplink control signaling and uplink data that are scheduled by a base station;
a resource mapping unit, configured to perform resource mapping separately for the uplink control signaling and the uplink data that are processed by the data processing unit, so as to obtain a frequency domain signal by mapping the data-processed uplink control signaling and uplink data to different resource block groups of a system bandwidth separately, each resource block group comprising at least one resource block such that the different resource block groups do not share common resource blocks, each resource block comprising a fixed number of consecutive subcarrier frequencies and a slot comprising a plurality of symbols, and each symbol having a duration of at least a reciprocal of a bandwidth of the subcarrier; and
a signal sending unit, configured to perform frequency-to-time conversion for the frequency domain signal obtained by the resource mapping unit to obtain a time domain signal, and then send the time domain signal to the base station, wherein: channel coding is performed by a channel coding subunit, scrambling is performed by a scrambling subunit, layer mapping is performed by a layer mapping subunit, and precoding is performed by a precoding subunit,
the channel coding subunit is configured to determine a channel coding rate of the uplink control signaling and a channel coding rate of the uplink data respectively according to a number of resource elements (REs) in a first resource block group that carries the uplink control signaling and that in a second resource block group that carries the uplink data;
the scrambling subunit is configured to scramble the uplink control signaling by using an initial value of a second scrambling sequence different from an initial value of a first scrambling sequence applied in scrambling the uplink data, wherein the initial value of the second scrambling sequence is greater than the initial value of the first scrambling sequence by one offset; or, compare a data stream length of the uplink control signaling with a data stream length of the uplink data, and if the data stream length of the uplink data is greater than the data stream length of the uplink control signaling, intercept a scrambling sequence of the uplink control signaling from a scrambling sequence of the uplink data, and if the data stream length of the uplink control signaling is greater than the data stream length of the uplink data, intercept the scrambling sequence of the uplink data from the scrambling sequence of the uplink control signaling, wherein initial values of the scrambling sequences of the uplink control signaling and the uplink data are the same;
the layer mapping subunit is configured to: map the uplink control signaling and the uplink data to different layers of respective codewords; if a number of layers of the uplink control signaling is different from a number of layers of the uplink data, before the terminal performs data processing for the uplink control signaling, receive the number of layers of the uplink control signaling, which is notified by the base station dynamically or configured by the higher layer, or, fix the number of layers of the uplink control signaling of the terminal to a preset number of layers; and the precoding subunit is configured to: if a precoding vector of the uplink control signaling is different from a precoding vector of the uplink data, before the terminal performs data processing for the uplink control signaling, receive the precoding vector of the uplink control signaling, which is notified by the base station dynamically or configured by the higher layer, or, fix the precoding vector of the uplink control signaling of the terminal to a preset precoding vector.

9. The terminal according to claim 8, wherein the at least one hardware processor further implements:

a receiving unit, configured to receive first control signaling from the base station before performing the resource mapping, wherein the first control signaling indicates that, the uplink control signaling and the uplink data, which are scheduled by the base station, are carried in different resource block groups in the system bandwidth; wherein the resource mapping unit is configured to perform resource mapping separately for the data-processed uplink control signaling and uplink data according to information indicated in the first control signaling received by the receiving unit.

10. The terminal according to claim 8, wherein the at least one hardware processor further implements:

an identifying unit, configured to identify whether an original number of bits of the uplink control signaling is greater than a preset number of bits, wherein the resource mapping unit is configured to perform the resource mapping separately when the identifying unit identifies that the original number of bits of the uplink control signaling is greater than the preset number of bits.

11. The terminal according to claim 8, wherein the resource mapping unit comprises:

a mapping relationship obtaining subunit, configured to obtain, from second control signaling received by the receiving unit from the base station, a mapping relationship between the uplink control signaling and uplink data and the different resource block groups in the system bandwidth, or, obtain a mapping relationship between the uplink control signaling and uplink data and the different resource block groups in the system bandwidth, which is configured fixedly on the terminal; and a mapping subunit, configured to map the data-processed uplink control signaling and uplink data to the different resource block groups in the system bandwidth according to the mapping relationship obtained by the mapping relationship obtaining subunit.

12. The terminal according to claim 11, wherein the second control signaling is dynamic signaling or higher layer signaling that comprises a mapping identifier, and the mapping identifier indicates the mapping relationship.

13. The terminal according to claim 8, wherein the data processing unit is configured to perform data processing separately for the uplink control signaling and the uplink data that are scheduled by the base station, wherein the data processing comprises any one or any combination of the following: additional cyclic redundancy check (CRC), the channel coding, the scrambling, modulation, the layer mapping, linear transformation, and the precoding.

14. The terminal according to claim 13, wherein:

the modulation is performed by a modulation subunit, and the linear transformation is performed by a linear transformation subunit on the uplink control signaling and the uplink data, the modulation subunit is configured to: if a modulation mode of the uplink control signaling is different from a modulation mode of the uplink data, before the terminal performs data processing for the uplink control signaling, receive the modulation mode of the uplink control signaling, which is notified by the base station dynamically or configured by a higher layer, or, fix the modulation mode of the uplink control signaling of the terminal to a preset modulation mode, and the linear transformation subunit is configured to set a target length of the linearly transformed uplink control signaling to a number of frequency domain subcarriers in a resource block group used for carrying the uplink control signaling, and set a target length of the linearly transformed uplink data to the number of frequency domain subcarriers in a resource block group used for carrying the uplink data.

15. A base station, comprising: at least one hardware processor;

a memory interfaced to the at least one processor and including instructions executable by the at least one processor to implement:

a signal receiving unit, configured to receive a time domain signal comprising uplink control signaling and uplink data from a terminal, and perform time-to-frequency conversion for the received time domain signal to obtain a frequency domain signal; and a demapping unit, configured to perform resource demapping for the frequency domain signal obtained by the time-to-frequency conversion by the signal receiving unit so as to obtain the uplink control signaling and the uplink data by extracting the uplink control signaling and the uplink data from different resource block groups of a system bandwidth, each resource block group comprising at least one resource block such that the different resource block groups do not share common resource blocks, each resource block comprising a fixed number of consecutive subcarrier frequencies and a slot comprising a plurality of symbols, and each symbol having a duration of at least a reciprocal of a bandwidth of the subcarrier, wherein:

layer demapping is performed by a layer demapping subunit, descrambling is performed by a descrambling subunit, and channel decoding is performed by a channel decoding subunit, the layer demapping subunit is configured to perform layer demapping for the uplink control signaling and the uplink data at different layers of respective codewords, wherein if a number of layers of the uplink control signaling is different from a number of layers of the uplink data, the number of layers of the uplink control signaling subjected to layer demapping by the base station is a number of layers dynamically notified by the base station or configured by a higher layer to the terminal for layer mapping, or, the number of layers of the uplink control signaling subjected to layer demapping by the base station is fixed to a preset number of layers;

the descrambling subunit is configured to descramble the uplink control signaling with an initial value of a scrambling sequence different from an initial value of a scrambling sequence of the uplink data, wherein the initial value of the scrambling sequence of the uplink control signaling is greater than the initial value of the scrambling sequence of the uplink data by one offset; or, if a data stream length of the uplink data is greater than a data stream length of the uplink control signaling, intercept a scrambling sequence of the uplink control signaling from a scrambling sequence of the uplink data, and if the data stream length of the uplink control signaling is greater than the data stream length of the uplink data, intercept the scrambling sequence of the uplink data from the scrambling sequence of the uplink control signaling, wherein initial values of the scrambling sequences of the uplink control signaling and the uplink data are the same; and the channel decoding subunit is configured to perform channel decoding for the uplink control signaling whose channel coding rate is determined according to a number of resource elements (REs) in a first resource block group that carries the uplink control signaling, and the uplink data whose channel coding rate is determined according to the number of resource elements in a second resource block group that carries the uplink data, respectively.

16. The base station according to claim 15, wherein the at least one hardware processor further implements:

a first signaling sending unit, configured to send first control signaling to the terminal, wherein the first control signaling indicates that, the uplink control signaling and the uplink data, which are scheduled by the base station, are carried in different resource block groups in the system bandwidth, so that the terminal performs resource mapping separately for data-processed uplink control signaling and uplink data as indicated by the first control signaling.

17. The base station according to claim 15, wherein the at least one hardware processor further implements:

a second signaling sending unit, configured to send second control signaling to the terminal, wherein the second control signaling indicates a mapping relationship between the uplink control signaling and uplink data and the different resource block groups in the system bandwidth.

18. The base station according to claim 17, wherein the second control signaling is dynamic signaling or higher layer signaling that comprises a mapping identifier, and the mapping identifier indicates the mapping relationship.

19. The base station according to claim 15, wherein the at least one hardware processor further implements:

a data processing unit, configured to perform data processing separately for the uplink control signaling and the uplink data that are obtained by the demapping unit, wherein the data processing at least comprises any one or any combination of linear inverse transformation, the layer demapping, demodulation, the descrambling, the channel decoding, and (CRC) check processing.

20. The base station according to claim 19, wherein: the linear inverse transformation is performed by a linear inverse transformation subunit, and the demodulation is performed by a demodulation subunit, the linear inverse transformation subunit is configured to perform linear inverse transformation for the uplink control signaling whose length before linear transformation is the number of frequency domain subcarriers in a resource block group used for carrying the uplink control signaling, and the uplink data whose length before linear transformation is the number of frequency domain subcarriers in a resource block group used for carrying the uplink data, respectively, and the demodulation subunit is configured to: if a demodulation mode of the uplink control signaling is different from a demodulation mode of the uplink data, perform demodulation for the uplink control signaling in a demodulation mode configured by the base station dynamically or configured by the higher layer, or perform demodulation in a preset demodulation mode.

\* \* \* \* \*